Figure 1:
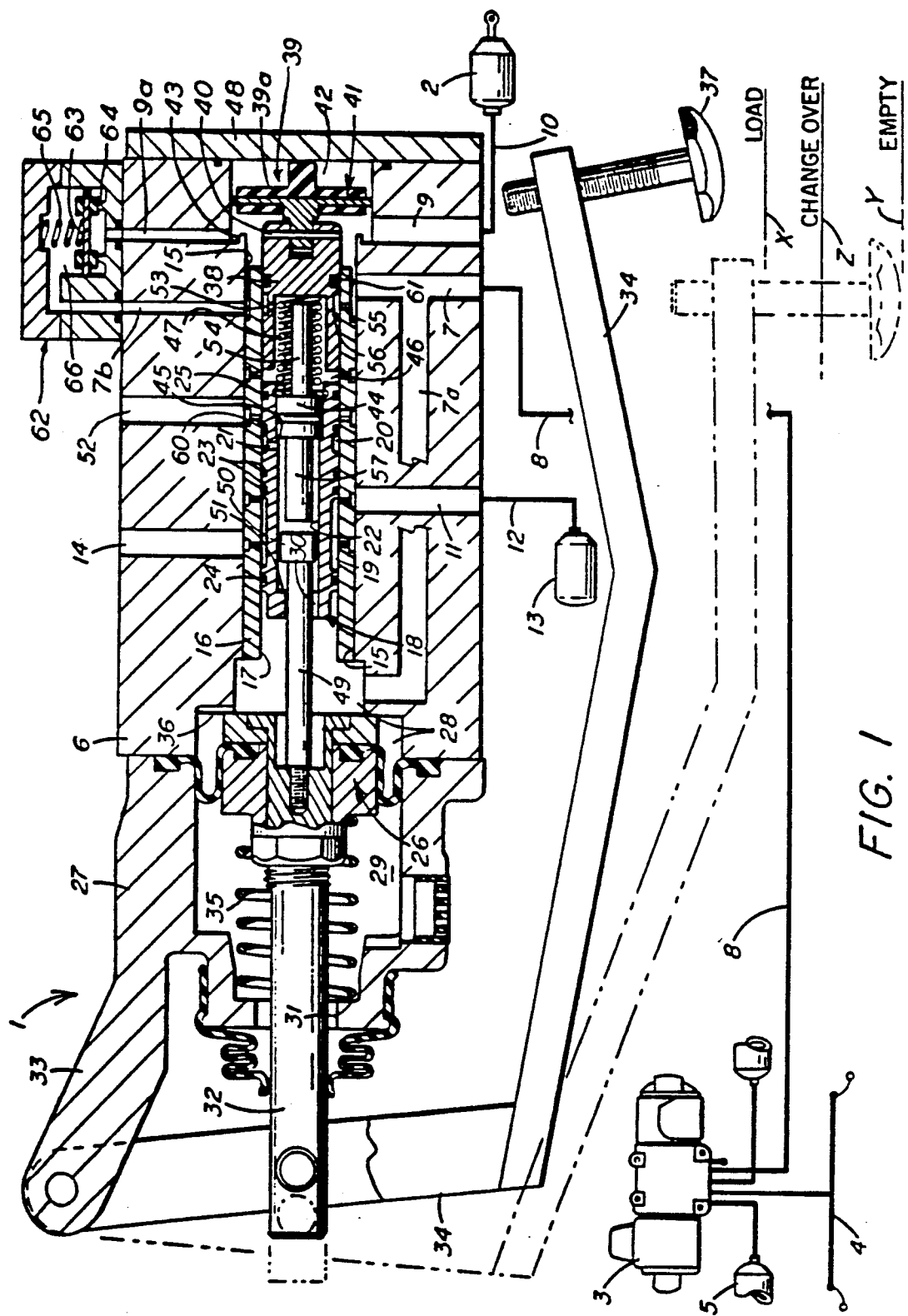

United States Patent [19]
McKay

[11] Patent Number: 5,100,207
[45] Date of Patent: Mar. 31, 1992

[54] EMPTY/LOAD CHANGEOVER VALVE WITH A VENT PASSAGE OPEN IN THE EMPTY SETTING

[75] Inventor: Albert A. McKay, Stoney Creek, Canada

[73] Assignee: Westinghouse Air Brake Company, Wilmerding, Pa.

[21] Appl. No.: 644,354

[22] Filed: Jan. 22, 1991

[51] Int. Cl.$^5$ .............................................. B60T 8/18
[52] U.S. Cl. .................................. 303/22.2; 303/22.6
[58] Field of Search ................... 303/22.2, 22.3, 22.6, 303/22.7, 22.8, 9.69; 188/195

[56] References Cited

U.S. PATENT DOCUMENTS

| | | | |
|---|---|---|---|
| 2,068,342 | 1/1937 | McClure | 303/22.2 |
| 3,376,080 | 4/1968 | Kettering et al. | 303/22.6 |
| 3,671,086 | 6/1972 | Scott | 303/22.2 |
| 4,080,005 | 3/1978 | Engle | 303/22.6 |
| 4,235,477 | 11/1980 | Hart | 303/22.6 |
| 4,235,478 | 11/1980 | Billeter | 303/22.2 |
| 4,291,923 | 9/1981 | Billeter | 303/22.2 |
| 4,417,767 | 11/1983 | Billeter | 188/195 |
| 5,005,915 | 4/1991 | Hart et al. | 303/22.2 |

Primary Examiner—Matthew C. Graham
Assistant Examiner—Josie A. Ballato
Attorney, Agent, or Firm—Falce: G. J.

[57] ABSTRACT

A empty/load changeover valve for a railway freight car having a proportioning valve via which the car control valve supplies and releases brake cylinder pressure. The proportioning valve comprises a balance piston having equal opposing pressure areas and a check valve integral therewith, one pressure area of the balance piston being subject to air supplied to the brake cylinder under all conditions of car loading. The opposing pressure area of the balance piston is either pressurized or depressurized depending upon the car being in a "load" condition or an "empty" condition of loading. This provides for a proportional mode of brake control during "empty" braking in which the brake pressure varies with the actual vehicle load. The arrangement prevents car rock and roll from influencing the proportioned brake pressure and makes provision for assuring release of the brakes in bypass of the proportioning valve.

25 Claims, 2 Drawing Sheets

EMPTY/LOAD CHANGEOVER VALVE WITH A VENT PASSAGE OPEN IN THE EMPTY SETTING

BACKGROUND OF THE INVENTION

The present invention relates to an empty/load type brake control system for a railway freight car and, more particularly, to an empty/load changeover valve device that employs a proportioning valve to load-adjust the brake cylinder pressure in the empty range of car weight.

Single capacity brake equipment produces a brake shoe force that is independent of car loading, thus making it difficult to achieve desirably higher braking ratios for a loaded car without exceeding an empty car braking ratio sufficient to cause wheel slide. Sliding wheels are undesirable from the standpoint of reduced braking retardation, and slid-flat wheels.

Special brake equipment is therefore necessary to increase the loaded car braking ratio without incurring the consequence of a wheel slide condition when braking an empty car. Such equipment automatically adjusts brake shoe force according to the load condition of the car. These special equipments fall into two primary categories, dual capacity empty/load braking and multiple capacity or continuously variable braking.

In the dual capacity empty/load equipment, there are just two settings, one for "empty" braking and one for "load" braking, the changeover point between the "empty" and "load" settings being selected at some predetermined car weight, usually at 20% of the full load capacity weight. In arbitrarily selecting this changeover point, it will be appreciated that a given car can be generally under-braked by the reduced brake pressure when the car weight is in the upper end of the "empty" weight range, since essentially the same adhesion demand is available at the lower end of the "load" weight range at which maximum braking force is capable of being supported without sliding the car wheels.

In the variable load type equipment, braking pressure is proportioned according to the actual load, generally throughout the full range of car loading. It will be appreciated, however, that the proportioned brake pressure is selected in accordance with the maximum brake pressure (emergency) capable of being developed from the maximum running pressure normally carried by a train (110 psi.). Therefore, when making relatively light service brake applications or when making a maximum brake application from a relatively low running pressure (70 psi.), the proportioned brake pressure may be far less than that capable of being supported by the adhesion demand. Accordingly, less than optimum brake efficiency is realized under certain brake conditions with variable load type brake equipment, as well as single capacity equipment, in order to protect against wheel sliding on an empty car under maximum braking conditions.

In known dual capacity brake systems such as disclosed in U.S. Pat. No. 3,671,086, a proportioning valve arrangement is employed to reduce the braking pressure by a fixed ratio during empty car braking. In order to be compatible with the quick service limiting valve requirements for freight brake control valves, which assures that 8 to 12 psi. brake cylinder pressure will be developed from even the lightest service application, the aforementioned system withholds the empty/load sensing function until a predetermined minimum brake cylinder pressure has developed, generally 12 psi. However, since an equalizing volume is required in such proportional type dual capacity systems to maintain proper control valve operation, an inadvertent loss of braking pressure can occur when the empty/load changeover valve sensing function comes into play, due to the existing brake cylinder pressure being able to momentarily backflow into the equalizing volume. This occurs when a light service reduction is made, just sufficient to operate the load sensing valve on empty cars, in which case, the brake cylinder pressure can build up to 12 psi. and then be reduced back to the limiting valve pressure setting on each car, which can be as light as 8 psi. This is caused by the brake cylinder air flowing into the empty/load equalizing volume.

The empty/load valve device disclosed in U.S. Pat. No. 5,005,915 overcomes this problem by providing a backflow check valve integral with the proportioning valve that is oriented to open in the flow direction of brake cylinder supply pressure and to close in the opposite direction corresponding to the exhaust of brake cylinder pressure. Such an arrangement prevents any inadvertent backflow of brake cylinder pressure and consequent loss of braking power, as could otherwise occur when the proportioning of brake cylinder pressure is initiated during a brake application, due to the fact that a previously vented equalizing reservoir is connected to the car control valve in parallel with the brake cylinder at this time.

In addition, the aforementioned U.S. Pat. No. 5,005,915 incorporates dual O-ring seals surrounding opposite sides of the respective annular passages of the empty/load spool valve, in order to prevent the car rock and roll from causing the spool valve to inadvertently transition between its empty and load settings, when the car load condition closely corresponds to the selected changeover point of the load sensing arm. In such an arrangement, however, it has been found possible that the sensor arm will pull the spool valve to a neutral position in which the dual O-rings are spaced on opposite sides of the bushing ports with which they control communication. In one aspect of this eventuality, the pressure in the proportioning valve balancing chamber becomes trapped at a value corresponding to the brake cylinder pressure at which the sensing arm is actuated. This trapped pressure coupled with the force of the proportioning spring is insufficient to maintain the proportioning valve open against the braking pressure acting in the opposite direction, when high brake pipe pressures are employed. Consequently, the proportioning valve check valve will be forced closed to initiate proportioning action of the brake cylinder pressure without the sensing arm actually passing through the changeover point from a load condition to an empty condition.

SUMMARY OF THE INVENTION

One object of the present invention is to provide an empty/load valve device that proportions the brake cylinder pressure in the empty range of car loading.

Another object of the invention is to provide an improved means of effecting the proportioning mode of control so as to isolate the effect of car rock and roll from the proportioned brake pressure.

In accordance with the foregoing objectives, there is provided an empty/load changeover valve device for use in a railway vehicle brake control system that includes a brake cylinder, and a brake control valve via which fluid under pressure is connected to the brake cylinder and released therefrom. The changeover valve device includes load sensing means for measuring the distance between the vehicle sprung and unsprung members to provide an empty setting and a load setting of the changeover valve device depending upon this distance being greater or less than a predetermined distance. An inlet passage of the changeover valve device is connected to the control valve and an outlet passage is connected to the brake cylinder. A backflow check valve element of a proportioning valve is engageable with a valve seat in the inlet passage in order to interrupt pressurization of the brake cylinder in a closed position and to permit such pressurization in an open position. A balance piston of the proportioning valve having equal opposing pressure areas is connected to the check valve element, one of the pressure areas being subject to the pressure at the inlet passage. This opposing pressure area of the balance piston is pressurized in the load setting of the changeover valve to maintain the check valve element in its open position consistent with a non-proportional mode of operation. Empty/load valve means depressurizes this pressure area in the empty setting, whereby a fluid pressure force imbalance is established across the balance piston in the direction of closure of the check valve element t initiate a proportional mode of operation. Cut-off valve means associated with the balance piston interrupts fluid pressure communication between the inlet passage and one opposing pressure area upon closure of the check valve element.

Figure 2:
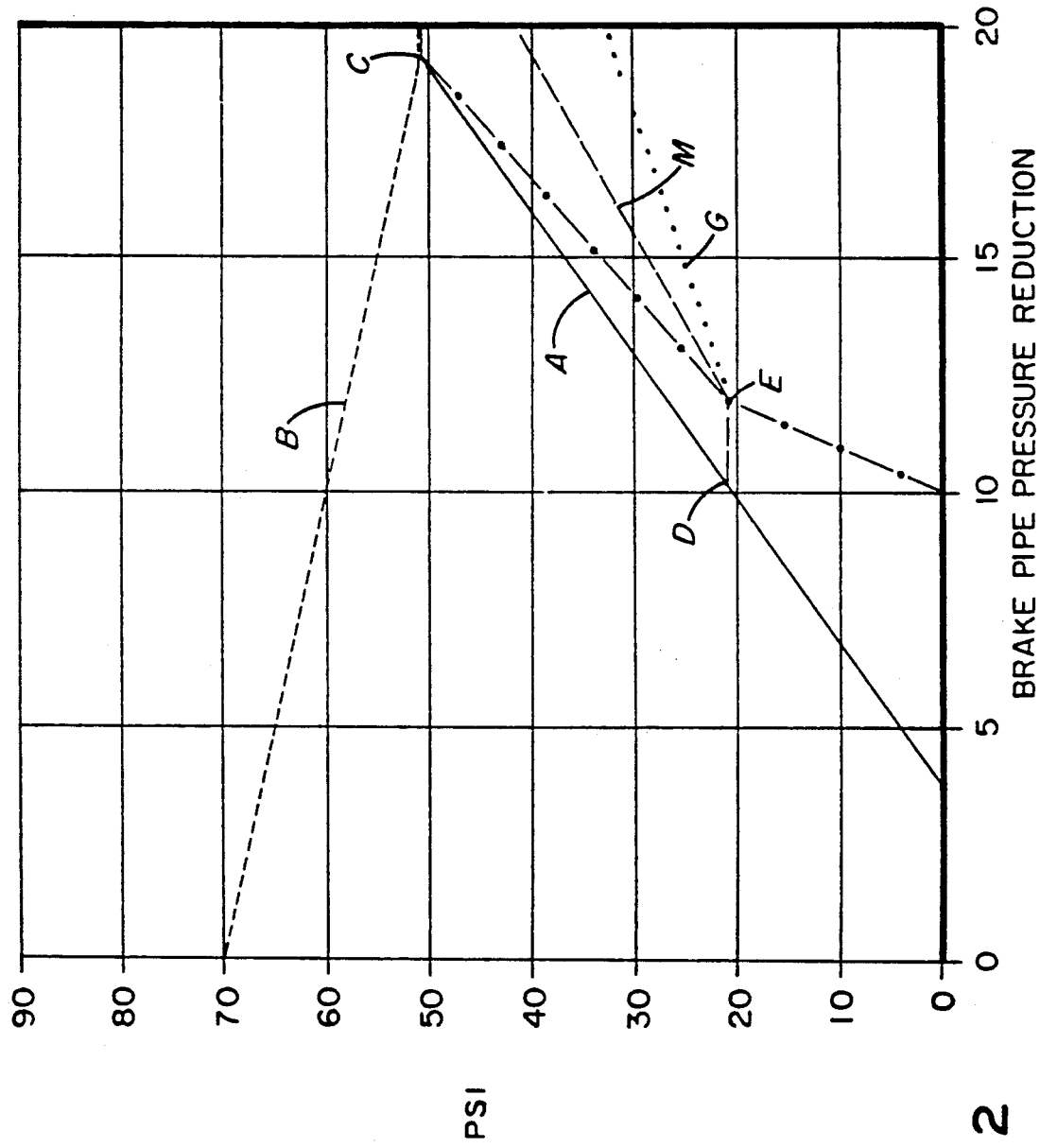

The foregoing objects and other features and advantages of the invention will be more readily understood from the following more detailed explanation when taken in conjunction with the accompanying drawings in which:

FIG. 1 is a schematic view of an empty/load brake control system showing a preferred embodiment of the changeover valve of the present invention in section; and FIG. 2 is a graph showing the empty and load controlled buildup of brake pressures.

DESCRIPTION AND OPERATION

In accordance with the present invention, there is shown in FIG. 1 an empty/load changeover valve device 1 interposed between a brake cylinder device 2 and a freight brake control valve device 3, such as a conventional ABDW type brake control valve device. As is well known, this control valve device 3 operates on the pressure equalization principle in response to reductions of the air pressure carried in a train brake pipe 4. An auxiliary reservoir 5 is charged to the pressure carried in brake pipe 4 and supplies air to brake cylinder device 2 in response to and in an amount dependent upon the reduction of brake pipe pressure, as controlled by control valve device 3. Pressure equalization exists between the compressed air in brake cylinder 2 and auxiliary reservoir 5 when a full service reduction of the brake pipe pressure is made.

The main body 6 of changeover valve device 1 is provided with an inlet passage 7 that is connected by a brake cylinder supply pipe 8 to control valve device 3, an outlet passage 9 that is connected by a delivery pipe 10 to brake cylinder device a passage 11 that is connected by a pipe 12 to an equalizing reservoir 13, and vent passages 14, 52 that are open to atmosphere.

Main body 6 further includes a bore 15 in which a bushing 16 is fixed, the respective passages 11, 14 and 52 being connected to a bore 17 of bushing 16 in which a spool valve 18 is axially disposed. Surrounding the periphery of spool valve 18 are annular grooves 19 and 20, groove 20 having a connecting port 21 leading to a stepped bore 22 of spool valve 18. A pair of O-ring seals 23 provide a pressure seal between grooves 19 and 20, while an O-ring seal 24 provides a pressure seal between groove 19 and the left-hand side of spool valve 18, an O-ring seal 25 provides a pressure seal between groove 20 and the right-hand side of spool valve 18, and an O-ring seal 60 provides a pressure seal between groove 20 and the port of vent passage 52.

A diaphragm type actuating piston 26 is clamped between main body 6 and an end body 27 to form on one side an actuating chamber 28 and on the other side a vent chamber 29. Actuating chamber 28 is communicated with stepped bore 22 of spool valve 18 via an opening 30 in the left-hand end of the spool valve, and with inlet passage 7 via a branch passage 7a.

Projecting through an opening 31 in end body 27 is a push rod 32 of actuating piston 26. An extension 33 of end body 27 pivotally supports a sensor arm 34 to which push rod 32 is connected to effect rotation of the sensor arm in response to operation of the actuating piston against the resistance of a retracting spring 35 in vent chamber 29. In its retracted position, actuating piston 26 is engaged with a stop provided by a flange 36 of main body 6, and an adjusting screw 37 of sensor arm 34 is displaced from an unsprung member, such as a railway car side frame, under all load conditions. Reference line X indicates the position of the car side frame relative to the car body (on which changeover valve device 1 is assumed to be mounted) in a fully loaded condition of car weight. Reference line Y indicates the position of the car side frame relative to the car body in a completely empty condition of car weight. A changeover point Z is selected representing the car weight at which transition occurs between an empty or load condition of car weight.

Aligned axially in bore 17 adjacent the right-hand side of spool valve 18 is a balance piston 38 having an annular groove 56 and an O-ring seal 61 surrounding its periphery. Connected to balance piston 38, as by a roll pin 40, for example, is a backflow check valve 39. Balance piston 38 and check valve 39 each have equal opposing pressure areas and comprise a proportioning valve 41 that may be controlled to operate in either a proportioning mode or in a non-proportioning mode. Check valve 39 includes an annular check valve element 39a that is guidably disposed in a cavity 42 formed in main body 6 at the right-hand side of bore 15 and into which cavity bore 17 opens. The check valve element 39a of check valve 39 is arranged to engage and disengage an annular valve seat 43 formed between bore 15 and cavity 42 on the upstream side of check valve 39. Inlet passage 7 opens into bore 15 at one side of valve seat 43 and outlet passage 9 opens into cavity 42 at the other side of valve seat 43. Accordingly, closure of check valve element 39a, by engagement with valve seat 43, interrupts the flow of compressed air between control valve device 3 and brake cylinder device 2, and the opening of check valve 39, by disengagement of check valve element 39a from valve seat 43, establishes this flow path. A port 55 in bushing 16 connects chamber 42 to groove 56.

Stepped bore 22 of spool valve 18 is closed by a sealed end plug 44 that is held in place against a shoulder 45 of stepped bore 22 by a snap ring.

Formed in bore 17 between this closed end of spool valve 18 and balance piston 38 is a balancing chamber 46 in which is disposed a proportioning spring 47 that acts between the end plug and balance piston 38. Provided between groove 56 and balancing chamber 46 is a connecting port 53. A cover 48 closes cavity 42 and serves as a stop against which the disc valve element of check valve 39 rests in its open position.

Spool valve 18 is connected to actuating piston 26 through a lost-motion connection therebetween. This lost-motion connection is provided by a connecting stem 49 that is fixed to actuating piston 26 at its one end and is formed with a head 50 at its other end that projects into stepped bore 22.

Head 50 of connecting stem 49 is axially spaced-apart from a shoulder 51 of stepped bore 22 when the actuating piston 26 is in contact with its limit stop 36 in the retracted position of sensor arm 34, and spool valve member 18 is in its rightward-most position, as shown. This distance between head 50 and shoulder 51 corresponds to the distance adjusting screw 37 of sensor arm 34 is retracted from the railway car side frame when the car is in a full load condition of car weight, as represented by line X. Thus, stem 49 of actuating piston 26 is free to move leftward from its shown position without imparting movement of spool valve 18 until the sensor arm 34 rotates through a range of travel sufficient to establish engagement with a fully loaded car side frame. In this manner, sensor arm 34 can be fully retracted to its shown position without requiring corresponding travel of spool valve member 18, so that the main body 6 housing the spool valve member 18 and bushing 16 can be limited in size.

In the shown position of spool valve member 18, head 50 of connecting stem 49 is spaced-apart from a stem 57 that projects from one side of end plug 44 into stepped bore 22. Another stem 54 that projects from the opposite side of end plug 44 into the balancing chamber 46 is adapted to engage balance piston 38 of the proportioning valve 41 to initially unseat check valve 39 from seat 43.

A release control valve device 62 is arranged in parallel with proportioning valve check valve 41. Release control valve device 62 includes a valve element 63 that is biased toward engagement with a valve seat 64 by a spring 65. A passage 7b in body 6 connects the area of cavity 42 within the periphery of check valve seat 43 to the area of a cavity 66 outside the periphery of the release control valve seat 64. Another passage 9a in body 6 connects the area of cavity 42 outside the periphery of check valve seat 43 to an area of cavity 66 within the periphery of release control valve seat 64.

BRAKE APPLICATION ON LOADED CAR

When a brake application is made by reducing the brake pipe pressure in a well-known manner, control valve device 3 connects air from the auxiliary reservoir 5 to brake cylinder supply pipe 8. The air supplied to pipe 8 is connected directly to brake cylinder 2 via inlet passage 7, open check valve 39, outlet passage 9 and pipe 10, to actuating chamber 28 via inlet passage 7 and branch passage 7a, and to balancing chamber 46 via port 53, groove 56, and port 55.

The air admitted to balancing chamber 46 balances the brake cylinder air pressure acting on the opposite side of balance piston 38. The opposing equal pressure areas of check valve element 39a are also subject to the brake cylinder pressure effective in cavity 42. Accordingly, proportioning valve 41 is force-balanced by the effective air loading, but is biased by proportioning spring 47 to maintain check valve 39 open. Consequently, the proportioning valve 41 is conditioned to operate in its non-proportioning mode, i.e., without reducing the pressure supplied to brake cylinder 2 via pipe 8.

As the brake cylinder pressure builds up, the corresponding pressure admitted to actuating chamber 28 acts on actuating piston 26. When the force of this pressure overcomes the opposing force of retraction spring 35, the sensor arm 34 is forced by push rod 32 to rotate about its pivot connection with extension 33 of end body 27 until adjusting screw 37 encounters the car side frame.

As long as the car weight is in the load range, such that the position of the car side frame relative to the car body is between the full load and changeover points represented by lines X and Z, connecting stem 49 will move with actuating piston 26 only sufficiently to allow head 50 to pick up shoulder 51 and pull spool valve 18 in a leftward direction a limited distance corresponding to the degree of rotation of sensor arm 34. This limited distance spool valve 18 moves is within its load range of travel, wherein equalizing reservoir 13 is vented via passage 11, spool groove 19 and vent passage 14. Although proportioning spring 47 becomes increasingly relaxed with this leftward movement of spool valve 18, sufficient force is still provided to maintain check valve 39 in its op n position through the entire load range of travel of spool valve 18. Brake cylinder pressure thus corresponds to the pressure supplied to pipe 8 via control valve device 3.

In the graph of FIG. 2, this direct or non-proportioned supply of brake cylinder pressure is represented by solid line A, which can be seen to increase as the brake pipe pressure represented by solid line B decreases, until at point C, pressure equalization occurs.

BRAKE RELEASE ON LOADED CAR

When a brake release is desired, brake pipe pressure is increased in a well-known manner to cause control valve device 3 to vent supply pipe 8. With check valve 39 being maintained in its open position, as explained, the air in brake cylinder 2 is released via outlet passage 9, open check valve 39, inlet passage 7, and the vented supply pipe 8.

BRAKE APPLICATION ON EMPTY CAR

Referring to FIG. 1, when the load sensor arm 34 is able to rotate sufficiently that adjusting screw 37 is deflected beyond the empty/load changeover point represented by line Z before encountering the car side frame, the car weight is indicated as being in the empty range of car loading. Actuating piston 26 consequently pulls spool valve 18 further leftward into its empty range of travel in which O-ring 25 establishes registry between vent passage 52 and balancing chamber 46. Preferably only a single connecting port 55 is provided in bushing 16 via which air is able to flow from chamber 42 to balancing chamber 46. On the other hand, the number and/or the size of the ports in bushing 16 connecting chamber 46 to passage 52 are greater than that of the single connecting port 55, so that the pressure in chamber 46 is rapidly depleted when O-ring 25 uncovers the port of passage 52. This creates an unbalanced air load across balance piston 38 in the direction of closure of check valve 39 to establish the proportioning mode of operation of proportioning valve 41. Consequent movement of proportioning valve 41 to its closed position causes O-ring 61 on balance piston 38 to be shifted to the left-hand side of connecting port 55 to cut off registry of chamber 42 with balance chamber 46. In addition, the position of spool valve 18, as established by the vehicle load condition, determines the degree of compression of proportioning spring 47 at the time of closure of check valve 39. The pick-up rate of proportioning spring 47 can be selected so as to make it more or less sensitive to the empty car load condition, as desired.

At the same time, spool groove 20 is registered with passage to connect air from supply pipe 8 to equalizing reservoir 13 via inlet passage 7, branch passage 7a, actuating chamber 28, opening 30 and stepped bore 22, connecting port 21, spool groove 20, passage 11 and pipe 12. This supply of air from pipe 8 to equalizing reservoir 13 occurs in parallel with the supply of air to brake cylinder via proportioning valve 41. Consequently, the brake cylinder pressure will be somewhat modulated by virtue of the volumetric expansion of auxiliary reservoir 5 with equalizing reservoir 13. The volume of equalizing reservoir 13 is selected so that following a proportioned full service brake application, the interconnected equalizing reservoir and auxiliary reservoir pressures will be substantially the same as the brake pipe pressure, as represented at point C in the graph of FIG. 2. From an initial charge of 70 psi., this equalization will occur between approximately 48 psi. and 52 psi., thereby effectively preventing an over-reduction of brake pipe pressure from producing a further increase in brake cylinder pressure.

Being located on the upstream side of brake cylinder device 2, it will be appreciated that check valve 39 will prevent any backflow of air from brake cylinder 2 when equalizing reservoir 13 is initially connected to inlet passage 7 in response to actuating piston 26 pulling spool valve 18 into its empty range of travel, as indicated at point D in the graph of FIG. 2. Also, spring 65 of release control valve 62 is sufficiently strong to maintain valve element 63 seated against the maximum opening force capable of being developed across valve element 63 due to the differential pressure between passages 7, 7b and 9, 9a during this initial movement of spool valve 18 into its empty range. This prevents any drop in the effective brake cylinder pressure while the equalizing reservoir pressure is building up to the effective brake cylinder pressure. Should the pressure at inlet passage 7 tend to drop when equalizing reservoir 13 is cut in, the resultant pressure reversal will effect closure of check valve 39 and valve element 63 of release valve device 62 will remain seated under the force of spring 65 to thereby isolate brake cylinder 2 from equalizing reservoir 13.

Following pressure equalization between volume reservoir 13 and brake cylinder 2, as represented by point E in the graph of FIG. 2, continued buildup of brake cylinder pressure will be proportioned in accordance with operation of proportioning valve 41.

During this proportioning phase of the brake pressure buildup, the supply of air to brake cylinder 2 via supply pipe 8 is reduced by the action of proportioning valve 41 according to the differential air load across balance piston 38 and check valve 39 offset by the force exerted by proportioning spring 47 according to the particular empty car load condition that might exist. It should be noted at this point that in the closed position of check valve element 39a, a differential pressure area is subject to the air in supply pipe 8, as determined by the difference in diameter between balancing piston 38 and the diameter of check valve element 39a within the area defined by valve seat 43. In this manner, a rightward acting force differential is exerted on proportioning valve 41 to effect opening of check valve 39 in response to a further increase of brake cylinder supply pressure when it is desired to increase a partial brake application.

The following table is a tabulation of a range of input pressures $P_i$ and the corresponding output pressures $P_o$ resulting from operation of proportioning valve 41 under different vehicle load conditions in the empty range of car loading, as represented by the different effective forces S of proportioning spring 47.

| | $P_o$ | | | |
|---|---|---|---|---|
| $P_i$ | S = 6.136 | S = 8.0 | S = 10.0 | S = 11.3 |
| 20 | 20 | — | — | — |
| 26 | 22 | 26 | — | — |
| 32.6 | 24.6 | 28.2 | 32.6 | |
| 36.83 | 25.6 | 29.7 | 34.0 | 36.8 |
| 50.4 | 30.13 | | | |
| 49.52 | | 33.84 | | |
| 48.6 | | | 37.9 | |
| 48.0 | | | | 40.6 |

The foregoing pressures $P_i/P_o$ may be calculated from the following balance equation for proportioning valve 41:

$$(A_2 - A_1) P_i + S = A_2 P_o \quad (1)$$

where
$P_i$ = brake cylinder supply pressure at passage (7)
$P_o$ = brake cylinder delivery pressure at passage (9)
$A_1$ = area of balance piston (38) subject to pressure $P_i$
$A_2$ = area of valve seat (43)
$S$ = force of spring (47)

letting $A_1$ = .3068 sq. in., and
$A_2$ = .4602 sq. in.

equation (1) becomes:
$$.1534 P_i + S = .4602 P_o \quad (2)$$
solving for $P_o$, equation (2) becomes:

$$P_o = \frac{P_i + 6.519 S}{3} \quad (3)$$

As previously mentioned, proportioning spring 47 exerts a variable force on proportioning valve 41 depending upon the actual position of spool valve 18 in its empty range of travel, as determined by the degree of sensor arm rotation required before adjusting screw 37 encounters the car side frame. If, for example, the adjusting screw 37 encounters the car side frame just beyond the changeover point in the empty range of car weight, the degree of compression of proportioning spring 47 will approach a maximum due to minimal leftward movement of spool valve 18 into the empty range of travel. On the other hand, if the car weight is such that the adjusting screw 37 fails to encounter the car side frame until it is at the other end of the empty range, the degree of compression of proportioning spring 47 will be substantially reduced, due to further leftward movement of spool valve 18 into the empty range of travel. The force exerted on proportioning valve 41 by proportioning spring 47 will thus vary with the degree of car loading, such that the proportioned brake cylinder pressure will be greater for heavier car weights than for lighter car weights within the empty car brake range, in accordance with the foregoing equation (3).

In the graph of FIG. 2, for example, point E represents the pressure at which proportioning valve operation commences under the influence of a proportioning spring 47 that reflects a given car weight in the empty range. The slope of dotted line G represents the proportioned brake cylinder pressure. The slope of line G, and thus the proportioned brake cylinder pressure, thus varies with the degree of compression of spring 47.

In accordance with the foregoing, the effect of proportioning spring 47 should now be clear in terms of achieving different levels of proportional brake cylinder pressure for a given brake application, depending upon the actual weight of a railway car that is conditioned for empty car braking.

In providing a double O-ring seal 23 and O-ring seal 24 on opposite sides of spool valve groove 19, as well as an O-ring seal 61 on balancing piston 38, changeover valve device 1 is prevented from transitioning between its empty and load setting due to car body rock and roll. The distance between the pair of O-rings 23 provides a deadband zone within which spool valve 18 can move between its empty and load ranges of travel due to car rock and roll without changing the existing load setting. Adjusting screw 37 is set so that at the selected changeover point Z of sensor arm 34, spool valve 18 is located in a neutral position within the deadband zone by engagement of head 50 of connecting stem 49 with shoulder 51. In this deadband zone, O-rings 23 are equally displaced on opposite sides of the bushing port of passage 11 When spool valve 18 is shifted from its load range into the deadband zone, the O-ring 24 continues to isolate chamber 28 from groove 19 and O-ring 25 isolates balancing chamber 46 from the bushing port of vent passage 52. Concurrently, O-ring 23 on the left-hand side of the port of passage 11 cuts off venting of equalizing reservoir 13 via spool groove 19 and vent passage 14, but O-ring 23 on the right-hand side of the port of passage 11 continues to cut off pressurization of equalizing reservoir 13. It will be appreciated, therefore, that the spool valve porting necessary to establish the empty setting of changeover valve device 1, as previously explained, can only be achieved by spool valve movement through the deadband zone, as determined by the right-hand O-ring of O-ring seal 23 crossing the bushing port of passages 11 and O-ring 25 crossing the bushing port of vent passage 52. The deadband range of spool valve travel is such as to accommodate typical rock and roll undulations of a railway car.

When the spool valve 18 is within its empty range, balance chamber 46 is vented via passage 52, to condition proportioning valve 41 for the previously explained proportioning phase of operation. When this occurs, balance piston 38 is shifted leftwardly until check valve element 39a engages seat 43, in which position O-ring 61 crosses bushing port 55 to cut off charging of balancing chamber 46 via passages 7, chamber 42, port 55, and piston groove 56. In this manner, chamber 46 is able to breath in order to prevent spool valve oscillations resulting from car rock and roll from alternately pressurizing and depressurizing chamber 46 and thereby affecting the proportioned brake cylinder pressure.

BRAKE RELEASE ON EMPTY CAR

When a brake release is desired, brake pipe pressure is increased in a well-known manner to cause control valve device 3 to vent supply pipe 8. Consequently, the air under check valve 39 within the area of valve seat 43 on which check valve 39 is seated, is vented with the air in supply pipe 8. While this tends to reinforce the closure force on check valve 39, the air in cavity 66 outside the periphery of the release control check valve seat 64 is also vented via passage 7b and 7 leading to pipe 8. When a differential pressure between passages 7, 7b and 9, 9a develops sufficient to overcome the bias force of spring 65, the release control check valve 63 is unseated to allow the pressure in brake cylinder device 2 to be released at the car control valve via pipe 10, the area of cavity 42 outside valve seat 40, passage 9a, open check valve 63 of release control valve 62, passages 7b and 7, and pipe 8.

As brake cylinder pressure is thus released in the manner explained, in bypass of seated check valve 39, actuating chamber 28 is also being vented via pipe 8, allowing retracting spring 35 to eventually move actuating piston 26 toward its stop 36. Prior to actuating piston 26 engaging stop 36, however, head 50 of connecting stem 49 engages stem 53 of spool valve end plug 44 and moves spool valve 18 with it in a rightward direction. Stem 54 of end plug 44, in turn, engages balancing piston 38 to force check valve 39 off its seat 43 against the check valve closure force. This unseating of check valve 39 allows the differential pressure across check valve 39 to equalize, whereby proportioning spring 47 is effective to force balance piston 38 and check valve element 39a into engagement with cover 48 and, accordingly, maintain proportioning valve 41 in its open position. The remaining air in brake cylinder 2 is accordingly released via pipe 10, unseated check valve 39, inlet passage 7, pipe 8, and control valve 3, in parallel with the air being released via release control valve 62 until the differential pressure between passages 9, 9a and 7, 7b is insufficient to overcome the force of bias spring 65. When this occurs, release control check valve 63 becomes seated and the final air remaining in brake cylinder device 2 is vented via open check valve 39.

Concurrently with opening of check valve 39, as explained, spool valve 18 is shifted to its rightward-most position in which it is limited by engagement of check valve element 39a with cover 48. In this position of the spool valve, the air in reservoir 13 is exhausted via vent passage 14 and balancing chamber 46 is cut off from vent port 52. Also, supply passage 7 is re-connected to balance chamber 46 via bushing port 55, piston groove 56, and connecting passage 53. In this manner, the empty/load valve is conditioned for a subsequent brake control operation in response to another brake application.

I claim:

1. A changeover valve device interposed between a control valve and a vehicle brake cylinder for adjusting the brake cylinder pressure according to a vehicle load condition comprising:

(a) load sensing means for providing a load setting of said changeover valve device when the load of said vehicle exceeds a predetermined value and for providing an empty setting of said changeover valve when the load of said vehicle is less than said predetermined value;

(b) an inlet passage connected to said control valve and an outlet passage connected to said brake cylinder;

(c) proportioning valve means including:
  (i) a first valve seat between said inlet and outlet passages;
  (ii) a first valve element between said first valve seat and said outlet passage, said first valve element being engageable with said first valve seat in a closed position to interrupt fluid pressure communication between said inlet and outlet passages and disengageable therefrom in an open position to establish fluid pressure communication between said inlet and outlet passages;
  (iii) a balance piston to which said first valve element is connected having opposing pressure areas subject to the fluid pressure in said flow path in said open position of said first valve element;
  (iv) empty/load responsive valve means for venting fluid under pressure acting on one of said opposing pressure areas in said empty setting of said changeover valve device to create a differential force across said balance piston in a direction to effect movement of said first valve element to said closed position and thereby establish a proportional mode of operation of said proportioning valve means; and
  (v) said balance piston including cut-off valve means for establishing fluid pressure communication between said inlet passage and said one opposing pressure area of said balance piston in said open position of said first valve element and for interrupting fluid pressure communication between said inlet passage and said one opposing pressure area of said balance piston in said closed position of said first valve element.

2. A changeover valve device, as recited in claim 1, wherein the effective pressure area of said first valve element subject to said inlet fluid pressure in said closed position is less than the effective area of said first valve element subject to said outlet fluid pressure.

3. A changeover valve device, as recited in claim 1, further comprising spring means for urging said balance piston in the direction of opening of said first valve element.

4. A changeover valve device, as recited in claim 1, wherein said load sensing means comprises:
  (a) a sensing arm;
  (b) a fluid pressure operated actuating piston connected to said sensing arm and subject to fluid under pressure effective at said inlet passage to effect operation of said sensing arm; and
  (c) means for connecting said actuating piston to said empty/load responsive valve means.

5. A changeover valve device, as recited in claim 4, further comprising spring means interposed between said empty/load responsive valve means and said balance piston for exerting a variable force on said balance piston in the direction of opening of said first valve element in accordance with the position of said sensing arm in said empty setting of said changeover valve device.

6. A changeover valve device, as recited in claim 5, wherein the effective pressure area of said first valve element subject to said inlet fluid pressure in said closed position is less than the effective area of said first valve element subject to said outlet fluid pressure.

7. A changeover valve device, as recited in claim 4, wherein said means for connecting said piston abutment to said empty/load responsive valve means is a lost-motion connection.

8. A changeover valve device, as recited in claim 1, further comprising:
  (a) a main bore;
  (b) a first port of said inlet passage opening into said main bore;
  (c) said empty/load valve means including a spool valve member operably disposed in said main bore and having a first range of travel in said load setting of said changeover valve device and a second range of travel in said empty setting of said changeover valve device;
  (d) said balance piston being operably disposed in said main bore adjacent said spool valve member;
  (e) a balancing chamber in said main bore between said spool valve member and said balance piston;
  (f) said cut-off valve means comprising:
    (i) a first annular groove encircling the periphery of said balance piston and communicated with said first port in said open position of said first valve element;
    (ii) a connecting passage interconnected between said annular groove and said balancing chamber via which fluid under pressure is supplied from said first port of said inlet passage to said balancing chamber; and
    (iii) a first seal ring surrounding the periphery of said balance piston adjacent said first annular groove, said seal ring in said closed position of said first valve element lying between said first annular groove and said first port to interrupt fluid pressure communication between said inlet passage and said balancing chamber.

9. A changeover valve device, as recited in claim 8, wherein the fluid pressure effective in said balancing chamber acts on said one pressure area of said balance piston.

10. A changeover valve device, as recited in claim 8, further comprising:
  (a) a second port opening into said main bore;
  (b) a first vent passage between said second port and atmosphere; and
  (c) a second seal ring surrounding the periphery of said spool valve member so as to be interposed between said balancing chamber and said second port until such time as said spool valve member is shifted from said first range of travel to said second range of travel.

11. A changeover valve device, as recited in claim 10, wherein the fluid flow capacity of said first port is less than the flow capacity of said second port.

12. A changeover valve device, as recited in claim 10, further comprising a bushing in which said main bore is provided, said first port of said inlet passage being a single port in said bushing and said second port of said vent passage being a plurality of ports in said bushing, whereby the flow of fluid under pressure from said inlet passage to said balancing chamber is less than the flow of fluid under pressure from said balancing chamber to atmosphere when said spool valve member is in said second range of travel.

13. A changeover valve device, as recited in claim 12, wherein the fluid pressure effective in said balancing chamber acts on said one pressure area of said balance piston.

14. A changeover valve device, as recited in claim 10, further comprising:
   (a) third and fourth ports opening into said main bore;
   (b) an equalization reservoir;
   (c) an equalization passage between said third port and said equalization reservoir;
   (d) a second vent passage between said fourth port and atmosphere;
   (e) a first vent passage between said third port and atmosphere;
   (f) a branch passage between said main bore and said inlet passage;
   (g) an actuating chamber into which said main bore terminates at one end thereof;
   (h) said spool valve member including:
      (i) a central bore opening into said actuating chamber;
      (ii) a second annular groove surrounding the periphery of said spool valve member via which said third and fourth ports are connected in said load setting of said changeover valve device, said second annular groove in said empty setting of said changeover valve device being disconnected from said third and fourth ports;
      (iii) a third annular groove surrounding the periphery of said spool valve member;
      (iv) a second connecting passage interconnected between said third annular groove and said central bore; and
      (v) said third groove being disconnected from said third port in said load setting of said changeover valve device and connected with said third port in said load setting thereof.

15. A changeover valve device, as recited in claim 14, wherein said spool valve member further includes third and fourth seal rings axially spaced along the periphery thereof between said second and third annular grooves, said third and fourth seal rings being axially aligned relative to said third port so as to lie on opposite sides thereof in a deadband zone between said first and second ranges of travel of said spool valve member.

16. A changeover valve device, as recited in claim 15, wherein said third and fourth seal rings lie intermediate said third and fourth ports in said empty setting.

17. A changeover valve device, as recited in claim 16, further comprising:
   (a) a fifth seal ring surrounding the periphery of said spool valve member between said third annular groove and said second port; and
   (b) a sixth seal ring surrounding the periphery of said spool valve member between said actuating chamber and said fourth port.

18. A changeover valve device, as recited in claim 15, wherein the axial dimension of said deadband zone corresponds to the distance between said third and fourth seal rings.

19. A changeover valve device, as recited in claim 18, wherein said load sensing means comprises:
   (a) a sensing arm;
   (b) a fluid pressure operated actuating piston connected to said sensing arm and subject to fluid under pressure effective at said inlet passage to effect operation of said sensing arm; and
   (c) means for connecting said actuating piston to said empty/load responsive valve means.

20. A changeover valve device, as recited in claim 19, wherein a vehicle has a sprung body and unsprung side frame members on one of which is mounted said changeover valve device; said sensing arm being engageable with the other of said body and side frame members, the distance therebetween being a measure of the vehicle load, said empty and load settings occurring when said distance deviates from a changeover point between said empty and load settings.

21. A changeover valve device, as recited in claim 20, wherein said spool valve member lies in said deadband zone when said sensing arm is at said changeover point.

22. A changeover valve device, as recited in claim 21, further comprising spring means for exerting a force on said balance piston in the direction of said open position of said first valve element.

23. A changeover valve device, as recited in claim 22, wherein said spring means acts between said spool valve member and said balance piston, whereby the force exerted by said spring means varies in accordance with the distance measured by said sensing arm in said empty setting of said changeover valve device.

24. A changeover valve device, as recited in claim 1, further comprising release control means for establishing fluid pressure communication between said inlet and outlet passages in bypass of said proportioning valve means in response to the release of fluid pressure from said inlet passage when said first valve element is in said closed position.

25. A changeover valve device, as recited in claim 24, wherein said release control valve means comprises:
   (a) a first branch passage connected to said inlet passage;
   (b) a second branch passage connected to said outlet passage;
   (c) a second valve seat in said second branch passage;
   (d) a second valve element engageable with said second valve seat in response to the fluid under pressure at said inlet passage being greater than the fluid under pressure at said outlet passage, and disengageable from said second valve seat in response to the fluid under pressure of said outlet passage being greater than the fluid under pressure at said inlet passage due to said release of fluid under pressure from said inlet passage; and
   (e) bias means for urging said second valve element toward engagement with said second valve seat.

* * * * *